US006282279B1

(12) United States Patent
Ricciardi (10) Patent No.: US 6,282,279 B1
(45) Date of Patent: *Aug. 28, 2001

(54) METHOD AND SYSTEM FOR PROCESSING OUTBOUND SERVICE CALLS VIA A NETWORK ADJUNCT PLATFORM

(75) Inventor: Dominic M. Ricciardi, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/220,566

(22) Filed: Dec. 23, 1998

Related U.S. Application Data (63) Continuation-in-part of application No. 08/798,531, filed on Feb. 10, 1997.

(51) Int. Cl.[7] .................................................. H04M 7/00
(52) U.S. Cl. ............... 379/219; 379/207.02; 379/209.01; 379/230; 379/243
(58) Field of Search .................................... 379/201, 207, 379/209, 210, 211, 212, 219, 220, 221, 229, 230, 115, 127, 243

(56) References Cited

U.S. PATENT DOCUMENTS

| | | | |
|---|---|---|---|
| 4,577,066 | 3/1986 | Bimonte et al. ................... | 179/18 B |
| 4,756,020 | 7/1988 | Fodale ................................. | 379/112 |
| 4,757,267 | 7/1988 | Riskin ................................ | 379/113 |
| 5,023,904 | 6/1991 | Kaplan et al. ....................... | 379/91 |
| 5,103,475 | 4/1992 | Shuen ................................. | 379/115 |
| 5,136,636 | 8/1992 | Wegrzynowicz ..................... | 379/207 |
| 5,367,566 | 11/1994 | Moe et al. ........................... | 379/243 |
| 5,369,695 | 11/1994 | Chakravarti et al. ................ | 379/211 |
| 5,432,845 | 7/1995 | Burd et al. ........................... | 379/210 |
| 5,442,689 | 8/1995 | Buttitta et al. ....................... | 379/201 |
| 5,481,603 | 1/1996 | Gutierrez et al. ..................... | 379/221 |
| 5,506,893 | 4/1996 | Buscher et al. ...................... | 379/127 |
| 5,506,897 | 4/1996 | Moore et al. ......................... | 379/220 |
| 5,533,111 | 7/1996 | Schlanger ............................. | 379/201 |
| 5,550,911 | 8/1996 | Bhagat et al. ........................ | 379/220 |
| 5,574,780 | 11/1996 | Andruska et al. ................... | 379/207 |
| 5,588,048 | 12/1996 | Neville ................................. | 379/127 |
| 5,594,787 | 1/1997 | Ohshima et al. ..................... | 379/114 |
| 5,633,919 | 5/1997 | Hogan et al. ........................ | 379/115 |
| 5,692,033 | 11/1997 | Farris .................................. | 379/209 |
| 5,748,724 | 5/1998 | Sonenberg ........................... | 379/212 |
| 5,751,792 | 5/1998 | Chau et al. .......................... | 379/207 |
| 5,768,359 | 6/1998 | DiPierro, Jr. et al. ............... | 379/209 |

Primary Examiner—Creighton Smith
(74) Attorney, Agent, or Firm—Banner & Witcoff, Ltd.

(57) ABSTRACT

A method and system for processing a variety of outbound service calls initiated by a network adjunct platform (NAP) over a Small Scale Adjunct Primary Rate Interface (SSA PRI) in a telecommunications network on a call by call basis is disclosed. A outbound service subscriber triggers the NAP to initiate the desired outbound service call. The outbound service call may include, for example, a software defined network call (SDN), an AT&T Digital Link (ADL) call, or a Megacom call or other such suitable outbound service call. The NAP forwards set-up data based on the type of call desired to an originating toll switch (OTS) programmed to accept the set-up data from the NAP. After receipt of the set-up data, the OTS determines if the forwarded set-up data classifies the call as an outbound service call. If the forwarded set-up data contains outbound service parameters, the originating toll switch processes and routes the call initiated by the NAP as the appropriate outbound service call. The outbound service calls may include a local call, a long distance call or an international. The originating toll switch is also able to process and route non-outbound service or regular calls utilizing the same SSA PRI used for the appropriate outbound service calls. The need for separate dedicated trunk groups for each type of outbound service and for each subscriber of such service may be alleviated.

37 Claims, 8 Drawing Sheets

METHOD AND SYSTEM FOR PROCESSING OUTBOUND SERVICE CALLS VIA A NETWORK ADJUNCT PLATFORM

This is a Continuation-In-Part (CIP) application of a U.S. application Ser. No. 08/798,531, filed on Feb. 10, 1997.

TECHNICAL FIELD

This invention relates generally to a method and system for processing of telephone calls by a switching network and more particularly, to processing a variety of a outbound service calls via a network adjunct platform (NAP) over a Small Scale Adjunct Primary Rate Interface (SSA PRI) on a call by call basis.

BACKGROUND OF THE INVENTION

Many telephone subscribers, particularly large business entities, provide sophisticated and diverse services and information to their customers over the telephone. To this end, 800 or toll-free numbers were established for customers to reach designated subscribers. The 800 service feature offers a subscriber a number of advantages. For example, an 800 telephone number may be associated with the subscriber rather than a local number for the subscriber's telephone equipment. As another example, calls placed to an 800 number may be directed to one of a number of the subscriber's geographically disposed locations based on the time of day. For example, a subscriber may have a home location and also may have a work location.

U.S. Pat. No. 5,369,695 entitled "Method of Redirecting a Telephone Call to an Alternative Destination," incorporated herein by reference in its entirety, describes a facility for redirecting a call, from a customer, from one destination point in a communication network to another destination point in the event that the customer's call has not been answered within a predetermined period of time for example, through a call forwarding feature or in the event that after the customer's call has been answered, the subscriber requests such redirection. This is accomplished by storing in the memory of a Network Control Point (NCP), a centralized data base, a ringing time value and a call redirect code to handle redirection of the 800-number call.

Further, a calling customer may initially reach the subscriber by dialing the toll free or 800 number provided by the subscriber. The calling customer is connected to a primary subscriber location designated to answer 800 calls. However, it may be determined that an operator at the primary subscriber's location cannot fully assist the caling customer and must redirect the call. In the event the attendant at the primary subscriber's location is unable to assist the calling customer, the primary subscriber redirects the call.

Prior art redirecting, routing and billing of calls, similar to that described in U.S. Pat. No. 5,432,845 entitled "Post Answer Telephone Call Redirection or Rerouting," incorporated herein by reference in its entirety, typically employ an adjunct processor which provides a feature referred to a "post answer call redirection" which monitors the customer's call after it is answered by an attendant or other subscriber personnel at the primary location. If the call is to be redirected from the primary location to an alternate location, the adjunct is signaled by inband signaling, for example, a dual tone multi-frequency (DTMF) sequence, or by out of band signaling, for example, common channel interoffice signaling (CCIS). The adjunct responds by putting the calling customer on hold and initiating a call to the alternate location. The second call is initiated in such a way that it emulates or imitates both the routing and billing characteristics of a call made from the original calling customer's location. This feature is important because it bills the subscriber of the 800 number only for the first call and not the redirected call.

Besides 800 numbers, other intelligent systems, including virtual private networks' and "software defined networks" (SDN) utilize the important features of routing, redirecting, and billing. The SDN system requires a subscriber to have a special internal dialing plan where the subscriber may make calls from many locations. Usually, SDN subscribers are large business entities; however, the system may be used by individuals. A toll office receives a special internal dialed number from the business subscriber where the dialed number is translated in a database to determine the routing of the call. The SDN system is implemented by retrieving subscriber stored numbers in located the database. The business subscriber dials the special internal number, a subscriber stored number is retrieved and the call is quickly routed to the desired party at a savings to the subscriber. U.S. Pat. No. 5,481,603, entitled "Intelligent Call Processing Based Upon Complete identification of Calling Station," incorporated herein by reference in its entirety, employs an intelligent processing method for routing intelligent systems using a local database called a global title translation (GTI) database incorporated with an originating switch to receive a query fully identifying the calling station. The GTT database responds to the query by identifying the particular NCP in the telecommunications network that contains the appropriate record for completing the call.

U.S. Pat. No. 5,103,475 entitled "Processing of the Telecommunications Call Billing Data," incorporated herein by reference in its entirety, describes a method for preparing a billing record for a special service telecommunications call such as a call over a software defined network. In order to properly bin and route SDN calls, multiple data bases are consulted to obtain the necessary information for handling these calls. A processor, implemented in a toll switch is programed to accept and store information associated with the routing and billing of SDN calls.

Since the computer processing switches that route calls within the telecommunications network typically lack sufficient capability to process customized services such as customized billing, call forwarding, answering services, voice messaging, and the like, separate processors, referred to as adjuncts have been incorporated in the telecommunications network. U.S. Pat. No. 5,550,911 entitled "Adjunct Call Handling for Accessing Adjunct-Based Capabilities Platform," incorporated herein by reference in its entirety, describes a method for allowing certain types of adjunct applications for telecommunications networks that require caller interaction during a call setup to temporarily access the adjunct and then to release the call back to the network for routing to the final destination. Specifically, when the call enters the network, the network originating switch directs certain calls to the adjunct. The adjunct may be locally located at the originating switch or may be located remotely off a centrally located switch. Once the call has been routed to the adjunct and caller interaction has been completed, the adjunct releases the voice connection back to the switch which then routes the call to its final destination. While adjuncts in the telecommunications network are able to route many different types of calls, adjuncts currently are not able to route a variety of outbound calls for example software defined calls or other such outbound service calls.

In addition to providing sophisticated and diverse services to their customers, many Inter-exchange Carriers (IXCs)

have entered into the local telephone market. Some IXCs companies offer competitive options over the typical Local Exchange Carriers (LEC) who may charge high local access fees. Companies such as, for example, AT&T offer AT&T Megacom Service or AT&T Digital Link (ADL) Service, for example, as described in co-pending U.S. application Ser. No. 08/787,421, filed Jan. 23, 1997 and other such proprietary outbound services. Megacom is a unique, tariffed service offering which allows direct connect customers, customers/subscribers with direct access to a Originating Toll Switch (OTS), to dial long distance POTS (Plain Old Telephone Service) calls and international calls, bypassing the local telephone companies. Similarly, AT&T Digital Link (ADL) is a unique, local/toll service offering which allows direct connect customers, customers/subscribers with direct access to an Originating Toll Switch (OTS) to dial outbound local/toll calls bypassing the local telephone companies. By avoiding local access fees, IXCs can offer their services at more competitive rates with savings being passed on to the customers/subscribers.

Figure 6:
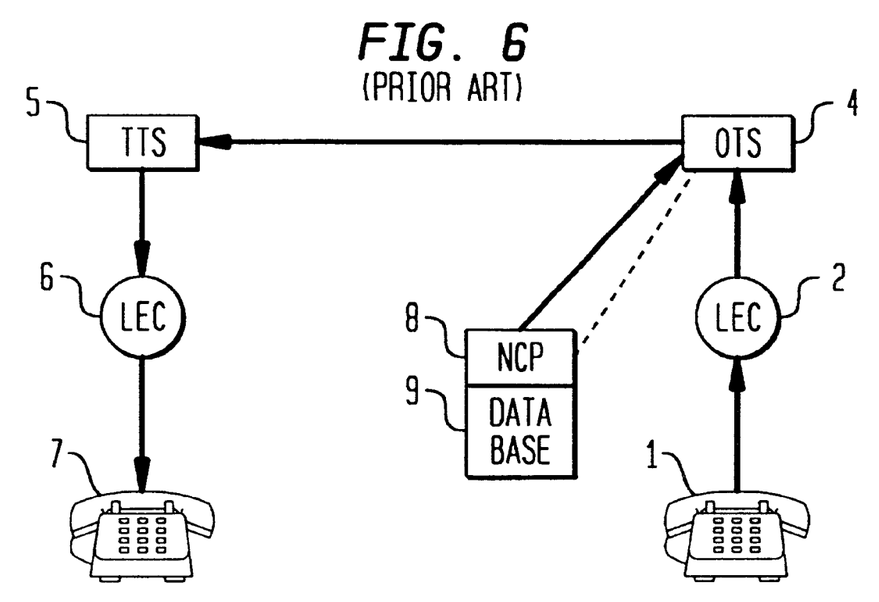
FIG. 6 is an illustration of a prior art system for processing calls without using a NAP system.

According to prior art FIG. 6, a typical calling party or subscriber 1 may be an individual or an entity and may use a personal, business, mobile or pay or other telecommunication apparatus to establish a call. Typically, a calling party/subscriber 1 is coupled via an originating local exchange carrier (LEC) 2 to an originating toll switch (OTS) 4 for example an originating AT&T switch. Such switches, for example, may comprise #4 electronic switching system manufactured by Lucent Technologies, Inc. or other large or small toll switches known in the art.

Figure 6A:
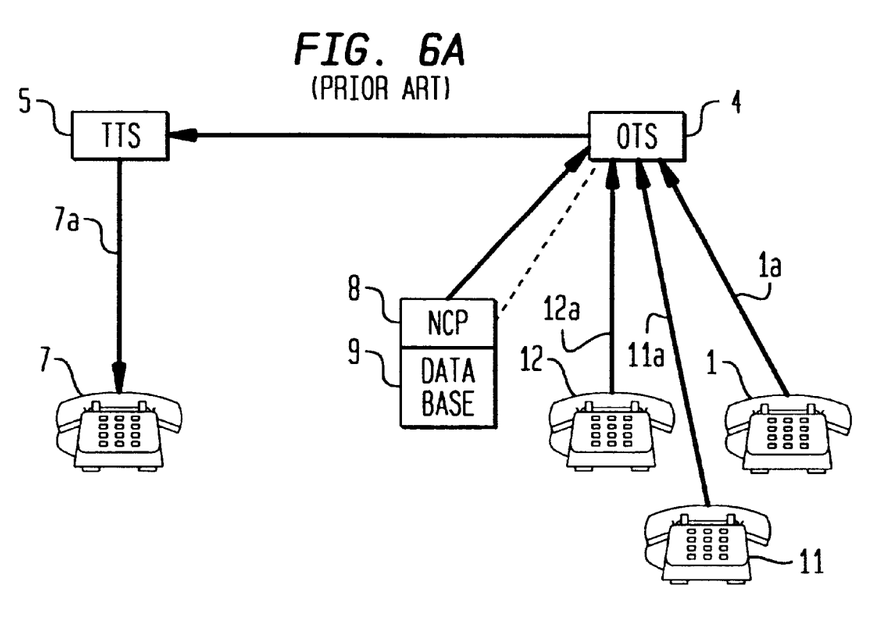
FIG. 6a is an illustration of a prior art system for processing SDN calls without using a NAP system.

In another case (not shown), the LEC 2 is bypassed. For example, the calling party/subscriber 1 may be directly connected to OTS 4 as in a cellular telephone connected to a toll switch or other LEC bypass equipment. In addition, the calling party/subscriber 1 may represent a personal computer accessing the public switched telephone through the Internet (not shown). Such access may occur at the LEC 2 or at the OTS 4. Referring to FIG. 6a, when the calling party/subscriber 1 is, for example, an SDN caller, dedicated trunk groups 1a and 7a are established between calling party/subscriber 1 and OTS 4 and between a terminating toll switch (ITS) 5 and a called party 7, respectively. These dedicated trunk groups form direct connections between the calling party/subscriber 1 and the called party 7. In the case where multiple SDN subscribers 1, 11 and 12, place calls into the network, each SDN subscriber is assigned a separate dedicated trunk group such as 1a, 11a and 12a for placing SDN calls. Moreover, each dedicated trunk group is only used for SDN calls or other subscribed to outbound calls. Thus, if the calling party wishes to subscribe to additional services, for example, ADL, the subscriber will likely need additional trunks and/or additional end equipment, for each desired service. Using prior art methods, the OTS 4 recognizes the trunk group as, for example, an SDN call assigned to a particular subscriber.

Referring again the FIG. 6, OTS 4 is shown directly linked to the terminating toll switch (TTS) 5, for example, Terminating AT&T Switch and OTS 4 communicates with a network control point (NCP) 8. In a typical toll network, a plurality of toll switches may be linked by toll trunks or other links that may comprise facilities of optical fiber, land-based microwave, satellite or other facilities known in the art (not shown).

NCP 8 having a database 9, is shown coupled to OTS 4. NCP 8 is a shared resource and may be coupled to many, if not all, switches of a plurality of a particular toll network. NCP 8 typically comprises a programmed computer and memory and may store a table of identification data such as telephone numbers, credit card numbers, and the like. Database 9 also comprises a programmed computer and memory to update NCP 8.

Types of calls using the telecommunication network in FIGS. 6 and 6a include 800 calls, 900 calls, long distance calls, private numbering plan calls, software defined network calls, etc. The OTS 4 is typically arranged to provide processing of these calls which may query database 9 directly, call NCP 8 and retrieve information specific to a subscriber. This enables each 800, 900, private numbering plan or SDN subscriber to provide different routing or treatment that best suit the subscriber.

A feature of the SDN calling system is that there may be priority established for certain calls. For example, outbound calls from an executive of the SDN system may receive different treatment from call originating by another employee. This feature makes the SDN calling system a private network for its subscribers.

Again referring to prior art FIG. 6, it is assumed that the calling party/subscriber's call includes an Automatic Number Identification (ANI) identifying the origin of the call. For example, once the calling party/subscriber 1 places a call, database 9, associated with OTS 4, is checked to determine if there is any entry stored for the particular ANI associated with the calling party/subscriber 1. If any entry is found, the record contains the identity, typically in the form of a "point code" or address, for the particular NCP 8 which contains the call processing record for the call, as well as the subsystem number and customer ID which are needed to process the call. In response to the identification, a query is routed to the appropriate NCP 8 for further processing of the call. The call is eventually terminated with LEC 6 and desired called party 7 is notified of the call.

As stated earlier, other types of calls or services such as local calls, long distance calls, 800 calls or Megacom or ADL calls are unable to use the SDN dedicated trunk groups and/or related customer premise equipment (CPE). Thus to take advantage of additional services, for example, ADL, Megacom and/or other suitable services, the subscriber must add additional trunks and/or additional CPE.

Figure 7:
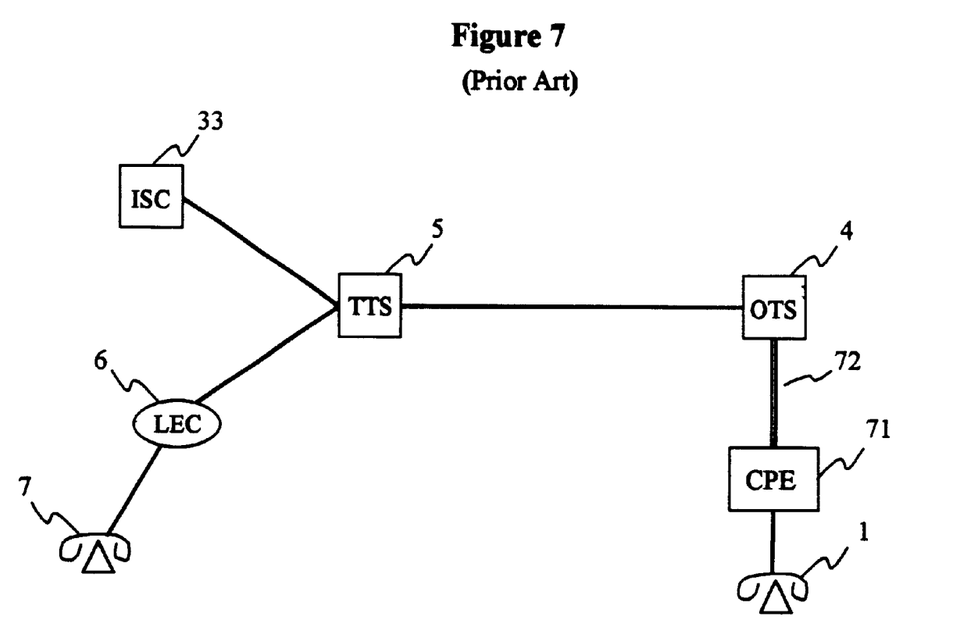
FIG. 7 illustrates a prior art system for processing Megacom and ADL service calls.

Prior art FIG. 7, illustrates a known technique by which a customer/subscriber 1 may access additional services such as, for example, Megacom service, or ADL service or any other such suitable service. A customer/subscriber may be required to purchase customer premise equipment 71 (CPE) specifically designed for each desired service. In addition, the customer must also pay for a dedicated trunk 72 specially configured for the service. As mentioned above each service may require an additional dedicated trunk and dedicated CPE. The CPE 71 may support Megacom tariff service or may support ADL tariff service or any other such available service. Similarly, the trunk line 72 may either be a dedicated Megacom trunk line or may be an dedicated ADL trunk line or a trunk line dedicated for any other such service. In some cases, the customer may not need to purchase the desired type of CPE 71, but may have to pay a monthly fee incorporated with or separate from the cost of the dedicated trunk 72 for each of the desired services. The dedicated trunk directly connects the customer/subscriber 1 with a operating toll switch 4 (OTS) via the CPE 71. The calling party/subscriber 1 of, for example, the Megacom service, dials a long distance telephone number or an international telephone number. The calling party/subscriber 1 will not be able to place an ADL call or other suitable outbound service call from the Megacom trunk and/or Megacom related CPE. Thus if the calling party subscribes to ADL service, the calling party will require an additional dedicated trunk and/or CPE. Once the appropriate ADL CPE and trunks are available at the subscriber's location, the calling party/subscriber 1 of the ADL service may be able to place an local/toll access call.

Depending on the equipment and service, the CPE 71 handles all the call signaling and provisioning to the OTS 4, over the dedicated trunk line, for processing the call. Based on the desired service and network call processing, the OTS 4 routes the call to the appropriate terminating toll switch 5 (ITS). The TTS 5 routes the call to the appropriate destination. If the subscribed to service is Megacom service and the originally dialed or destination number was a long distance number, the destination may be the appropriate Local Exchange Carrier 6 (LEC). If the originally dialed or destination number was an International number, the destination may be the appropriate International Switching Center (ISC) 33. On the other hand, if the subscribed to service is ADL service and the originally dialed or destination number was a local number, the destination may be the appropriate Local Exchange Carrier 6 (LEC). If the originally dialed or destination number was a toll number, the destination may be the appropriate Inter-exchange Carrier (IXC) (not shown). Using current methods, each of the above mentioned services requires separate end equipment and dedicated trunk lines for each outbound service call. To use Thus a customer/subscriber 1 desiring to have, for example, Megacom service and ADL service, to completely bypass the local telephone companies for all of their plain old telephone service (POTS) needs, must pay for each of the CPEs and corresponding dedicated trunks for each of the desired services. In addition, it is to be noted that ADL service is a local service offering while Megacom and SDN may both be long distance service offerings. Thus, generally, SDN calls and Megacom calls will require separate dedicated trunks since both services provide long distance service access.

Such services enable the IXC's to offer cost competitive access to local and international POTS services without paying the local telephones companies. The current arrangement, however, is problematic in that it requires customers to buy separate equipment and proprietary data pipes connecting to a telephone switch. Thus, the above described prior art arrangements preclude customers from taking advantage of the variety of outbound services without incurring additional costs and/or resources.

While adjuncts in the telecommunications network are able to route many different types of calls, adjuncts currently are not able to route a variety of a outbound service calls. Accordingly, what is required is a technique for processing calls in a telecommunications network from directly connected customers, for example, SDN subscribers, AT&T's Megacom subscribers, or ADL subscribers or any other such suitable services subscriber via a network adjunct platform (NAP) over a Small Scale Adjunct Primary Rate Interface (SSA PRI) on a call by call basis. Specifically, what is required is a system and method for initiating and processing a variety of outbound service calls via a NAP.

SUMMARY OF THE INVENTION

The present invention is directed to a system, method and apparatus for programming a telephone network switch in a telecommunication network such that the telephone network switch accepts SDN calls, Megacom calls, ADL calls, or any other such suitable calls initiated by a network adjunct platform (NAP) over a Small Scale Adjunct Primary Rate Interface (SSA PRI) on a call by call basis. Thus the present invention may provide directly connected customers or nodal customers with the ability to access a plurality of outbound services. The NAP may be comprised of an Intelligent Peripheral/Service Node (IP/SN) or any such intelligent switch capable of processing a plurality of different calls a subscriber may desire to make. The present invention is described, in various embodiments, in relation to modifying existing switching networks to recognize and allow, for example, SDN, Megacom, ADL or any other suitable service calls initiated by the NAP, without affecting the quality and service provided by each of the above mentioned individual system. The present invention, may eliminate the need for separate CPE and dedicated trunk lines for each of the desired service and permit greater flexibility and selection of services without equipment limitations. It should be noted that suitable services that provide similar access may generally require separate trunks or SSA PRIs connected to the NAP. For example, both SDN and Megacom services offer long distance access and thus may not be available via the same trunk or SSA PRI. However, ADL is a local service offering and thus may share the same trunk or SSA PRI with an SDN service for processing and access via a NAP. Similarly, ADL may also share the same trunk or SSA PRI with an Megacom service for processing and access via a NAP. In addition, other suitable services, offering diversified access, may be utilized via the same trunk or SSA PRI under embodiments of the present invention.

In accordance with embodiments of the present invention, a method is provided for programming a network switch for processing, for example SDN, Megacom, ADL or any other suitable service calls initiated by the NAP. As stated above, the NAP may be comprised of an IP/SN or any such intelligent switch capable of processing a plurality of different types of outbound service calls a subscriber may desire to make. The service subscriber, who is also the calling party, may triggers the NAP to initiate a call. For example, a subscriber may trigger the NAP by using direct inward dialing (DID), or by sending data packets to originate a call to the NAP via the Internet and/or a dedicated dial up line. The trigger may be a unique access code representing each of the various services available to the calling party. The services described above are only examples and additional services may be added permitting additional enhanced services. In one example, an ADL subscriber desiring to place an ADL call over the NAP may trigger the NAP to initiate an ADL service via an access code unique to the ADL service and/or subscriber. Accordingly, each of the available service may have its own unique identifying access code to trigger the NAP for initiating the desired call. As used herein, the subscriber or caller originates a call and the NAP initiates a call. The NAP returns the, for example, an SDN, Megacom, ADL or any other such suitable service subscriber's call by dialing a number previously stored in the NAP's memory associated with the call placed by the subscriber.

When the subscriber's call is returned, the NAP may prompt the SDN, Megacom, ADL or any such suitable service subscriber for information such as a password or the telephone number of a desired called party. After receiving the correct information, the NAP initiates the appropriate call, for example, a Megacom call to a telephone switch network for processing. The telephone switch may be, for example, an originating AT&T switch. Such switches, for example, may comprise #4 electronic switch system manufactured by Lucent Technologies, Inc. or other large or small toll switches known in the art for the processing of the appropriate PRI call. The telephone switch may be programmed to recognize the call initiated from the NAP as either an SDN, Megacom, ADL or any such suitable call and accordingly processes the call as required. The switch may continue to maintain the ability to process other type of calls in addition to SDN, Megacom, ADL and/or any other such suitable services offered and available to the subscriber.

A significant advantage of the present invention is that a single IP/SN or NAP may be programmed to process the variety of different types of calls without dedicated equipment and/or trunks for each service.

It should be understood that the present invention is not limited to the embodiments mentioned above since modifications may be made by persons skilled in the art. For example, additional services may utilize the NAP to process a variety of services without requiring additional dedicated trunk lines and/or additional equipment. Additional services, may include, Internet initialized calls, a data interface trigger or other such enhanced services. The present application contemplates any and all modifications that fall within the spirit and scope of the underlying invention disclosed and claimed herein.

BRIEF DESCRIPTION OF THE DRAWINGS

The invention will be described in detail herein with reference to the following figures in which like reference numbers refer to the elements, and wherein.

DETAILED DESCRIPTION OF THE PREFERRED EMBODIMENT

The principles of the present invention are illustrated in several exemplary embodiments which provides a routing scheme for processing a variety of uniquely tariffed outbound calls initiated by a network adjunct processor (NAP). My U.S. application Ser. No. 08/798,531, filed on Feb. 10, 1997, disclosed SDN access via a NAP. The present invention focuses on additional uniquely tariffed outbound service call access via a NAP. These additional outbound calls may include, for example, a Megacom call initiated by a NAP, an ADL call initiated by a NAP, or any other such suitable call via a NAP. It should be noted that services that provide similar access may generally require a separate trunk or a separate SSA PRI connected to the NAP. For example, both SDN and Megacom services offer long distance access and thus may not be available via the same trunk or SSA PRI. However, ADL is a local service offering and thus may share the same trunk or SSA PRI with an SDN service for processing and access via a NAP. Similarly, ADL may also share the same trunk or SSA PRI with a Megacom service for processing and access via a NAP. In addition, other suitable services, offering diversified access, may be utilized via the same trunk or SSA PRI under embodiments of the present invention. The embodiments discussed above and described below in detail are only given by way of example; it should be noted that the NAP, in accordance with the present invention, may be utilized to process a variety of additional types of suitable outbound service calls.

Figure 1:
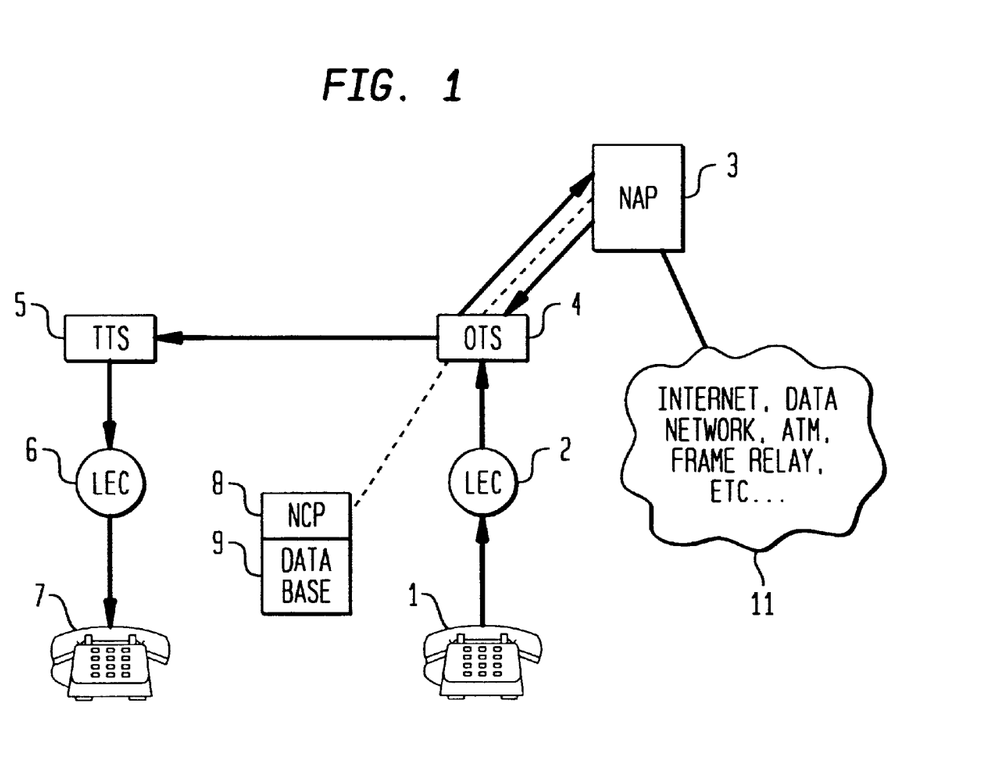
FIG. 1 is an exemplary embodiment of the present invention illustrating a system for processing a variety of calls using NAP capabilities.

The present invention permits a calling party/subscriber 1 to take advantage of a plurality of services offered, for example, by an inter-exchange carrier without requiring specialized equipment and individual trunk service for each. As discussed in my U.S. application Ser. No. 08/798,531, FIG. 1 illustrates a typical calling party/subscriber 1 may be an individual or an entity and may use a personal, business, mobile or pay or other telecommunication apparatus to establish a call. Typically, calling party/subscriber 1 is coupled via an originating local exchange carrier (LEC) 2 to an originating toll switch (OTS) 4 for example an originating AT&T switch. Such switches, for example, may comprise #4 electronic switching system manufactured by Lucent Technologies, Inc. or other large or small toll switches known in the art.

Referring again to FIG. 1, FIG. 1 shows an illustration of a network adjunct platform (NAP) 3 employed in the telecommunication network system, for processing a variety of outbound service calls. The NAP may be comprised of an Intelligent Peripheral/Service Node (IP/SN) or any such suitable intelligent switch capable of processing a plurality of different outbound service calls. The originating toll switch (OTS) 4 is responsible for determining whether a NAP 3 is necessary to process an adjunct-based application for a given telephone call. Adjunct-based applications include, but are not limited to, post answer call redirection or 800 numbers.

As part of the determination as to whether the NAP 3 is needed to direct a call, the OTS 4 may first perform a type of call trigger function to make an initial determination as to whether an incoming call to OTS 4 is a type of call for which the NAP 3 is necessary. Since the types of calls requiring adjunct access differs on a call-by-call and service-by-service basis, requirements for the type of call trigger function must be defined on an application-by-application basis. As further described in the present invention, an SDN trigger may be defined separately from a Megacom trigger which may further be defined separately from an ADL trigger. Thus any suitable service utilizing a NAP 3 may require a unique trigger for activating the Nap 3. Once it is determined that NAP 3 is required to complete the call, OTS 4 forwards data to the NAP 3 for processing and for routing the call.

However, if the call does not need the NAP 3 for processing, the call is routed through the OTS 4 and is processed by the network control point 8 (NCP) as shown in FIGS. 6.

Figure 2:
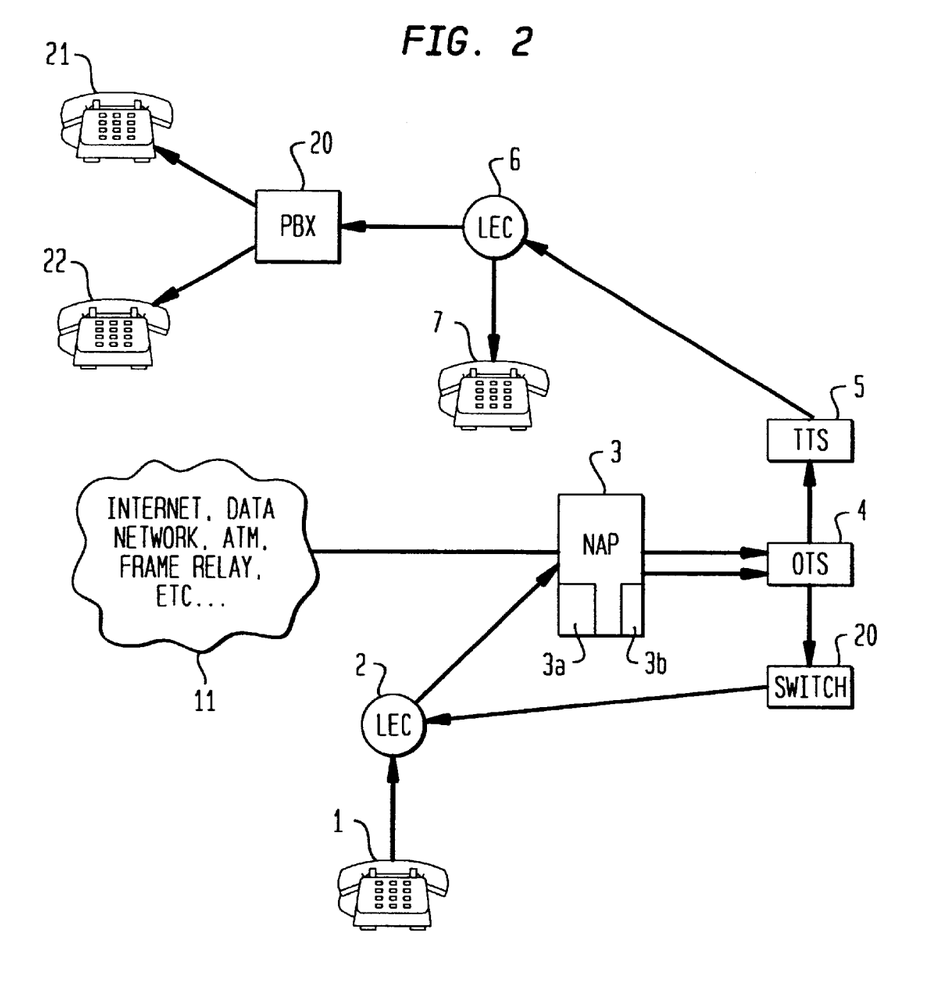
FIG. 2 is another embodiment of the present invention illustrating a software defined network call (SDN) being processed by the NAP.

As further discussed in my U.S. application Ser. No. 08/798,531, and referencing FIG. 2 herein, a calling party 1 who is, for example, an SDN subscriber may enter the telecommunication network by performing a triggering function activating NAP 3. Under exemplary embodiments of the present invention, as will be discussed in detail below, the calling party/subscriber 1 may also be a Megacom subscriber, an ADL subscriber and/or a subscriber of any other such suitable outbound service call. The triggering function, for example, may include the features of direct inward dialing (DID) wherein the SDN subscriber dials a special telephone number which originates a call. The special number or trigger may be unique, for example, to the SDN subscriber. The NAP may be connected to, for example, the Internet, or an ATM network or a frame relay network 11 or any other such suitable network as shown in FIG. 2. The originating call containing the trigger may be routed through to local exchange carrier (LEC) 2 as shown or directly to the NAP 3 (not shown). The NAP 3 includes a processor which recognizes this special dialed number or trigger as, for example, an SDN call. The NAP 3 locates the subscriber's information associated with the dialed number stored in memory 3a and returns the SDN subscriber's call. The subscriber information stored in memory 3a may include, for example, a return telephone number stored in a memory or other information identifying the subscriber. By using DID, the NAP 3 receives the originating call from, for example, the SDN subscriber but the NAP 3 does not answer the call. The SDN subscriber, for example, may allow the phone to ring for an allotted two or three rings and hangs up. The NAP 3 retrieves information associated with the dialed number and may return the SDN subscriber's call. The call returned by the NAP 3 may be routed through, for example, OTS 4. The calling party/subscriber 1 may change the call back number stored within, for example, the NAP memory 3a at any time before triggering the outbound service call. As stated above, the NAP may be connected to, for example, the Internet, or an ATM network or a frame relay network 11 or any other such suitable network as shown in FIG. 2. The calling party/subscriber 1 may initiate or trigger the NAP to set up the desired call via the Internet. Thus, for example, the calling party/subscriber 1 may be on line and may trigger the NAP 3 while on-line. The calling party/subscriber 1 may send out the appropriate trigger representing the type of call they desire to complete. If, for example, the Internet is used to trigger the NAP 3, the calling party/subscriber 1 may wish to store the appropriate call back number in the memory of the NAP 3a. This may be accomplished by the calling party/subscriber 1 prior to initiating the call via the Internet. The call back number may be stored within the NAP 3 or at an external location where it may be easily accessed by the NAP 3. Under exemplary embodiments of the present invention as will be described in detail below, the call back number may be unique for each different type of outbound service call. For example, the calling party/subscriber 1 may wish the NAP to call back a first number if a SDN call is desired or a second number if an ADL call is desired or even a third number if an Megacom call is desired. In addition, OTS 4 may include a memory sufficient to maintain an Automatic Number Identification (ANI) which may be used for billing and/or identification purposes. Moreover, OTS 4 may further include a controller used to efficiently route calls.

As described in my U.S. application Ser. No. 08/798,531, once the appropriate call back number is established, the OTS 4 may route the call through to another switch 20 having a memory, a microprocessor and a controller, which routes the call back to LEC 2. At this point, NAP 3 returns the SDN subscriber's originating call and prompts the SDN subscriber for information regarding the call the subscriber wishes to place. The information may be in relation to, for example, the SDN call the caller wishes to place. The NAP may prompt the calling party/subscriber 1 to supply information by a voice activated response, by DTMF inputs, via a personal computer or any suitable method known in the art. NAP 3 solicits information such as, for example, a password to verify that the caller is a legitimate subscriber of the desired outbound service call. Thus, for example, if the calling party/subscriber 1 initiates an SDN call, the NAP 3 may solicit a previously selected SDN password or other such information related to the completion of the desired call. The NAP 3 may also prompts the calling party/subscriber 1 to supply a desired called number which has been previously stored in a memory 3b of the NAP 3. The NAP may communicate with OTS 4 via a variety of suitable protocols, for example, the Q.931 protocol. As will be discussed in more detail below, the Q.931 protocol may be utilized by the NAP 3 to forward all pertinent information to the OTS 4 for processing the specific outbound call based on subscriber information.

Referring again to FIG. 2, after the OTS 4 receives all the pertinent information from the NAP 3, based on that information, the NAP may determine how the outbound service call may be routed. If the desired outbound call is an SDN call, for example, the SDN call may be further routed to TTS 5 which includes a memory, a microprocessor and a controller for routing calls. The call may then be routed to LEC 6 where, based on the called party number, the call is further routed to the called party 7 or to a PBX 20 or other telecommunication instruments to reach other desired called parties 21 and 22. Based on the Q.931 protocol information, if the OTS 4 determines that the call does not match the parameters of, for example, an SDN call, then the call may be routed as shown in FIG. 2 which utilizes the features of a NAP for non-SDN call processing.

Under exemplary embodiments of the present invention, a typical calling party/subscriber may establish, for example, a Megacom call and/or an AT&T Digital Link call (ADL) from the NAP 3. As discussed above, Megacom is a unique AT&T tariffed service offering. Megacom allows direct connect customers, for example, customers/subscribers with direct access to an Originating Toll Switch (OTS), to dial long distance POTS (Plain Old Telephone Service) calls and/or international calls. Similarly, ADL is a unique, local/toll service offering which allows direct connect customers, customers/subscribers with direct access to a Originating Toll Switch (OTS), to dial local and toll calls. Both Megacom and ADL outbound services may permit subscribers to bypass the local telephone company and utilize the IXCs, for example, AT&T, MCI or Sprint, for all their POTS services. Accordingly, the IXCs may offer a cost competitive option to their subscribers by avoiding some local exchange carrier fees.

Figure 3:
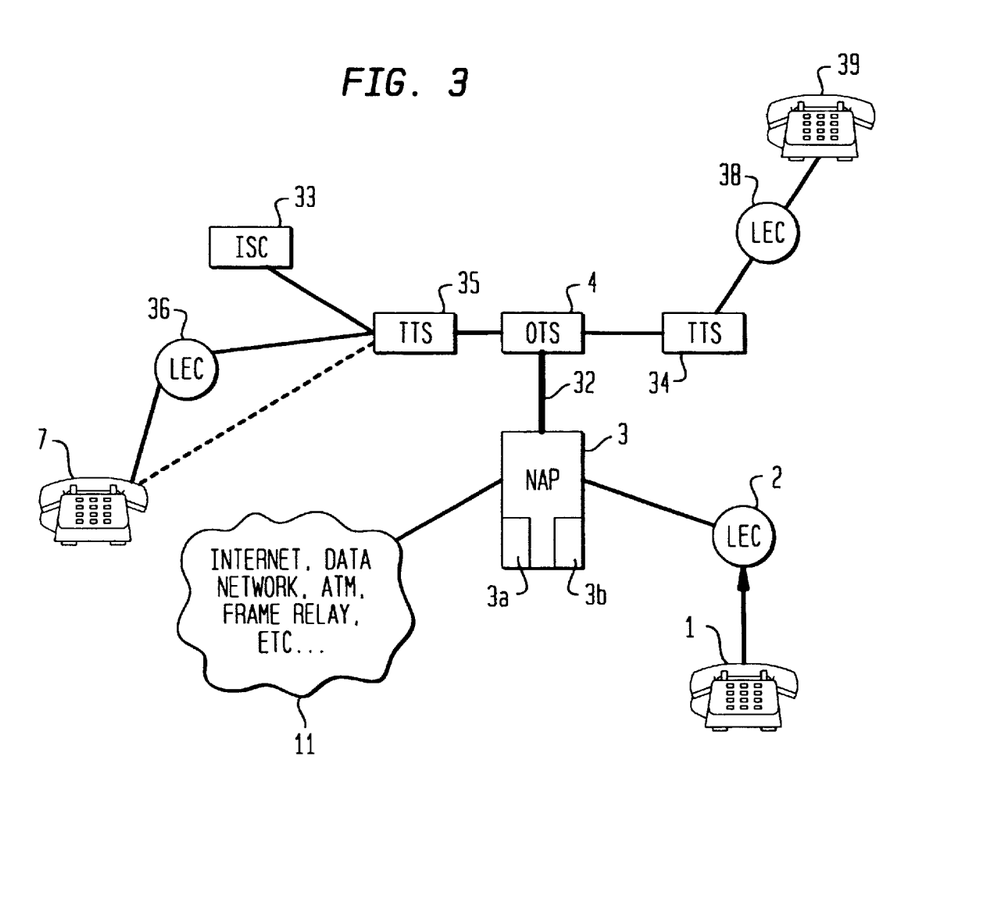
FIG. 3 is another embodiment of the present invention illustrating a Megacom call being processed via a NAP.
Figure 4:
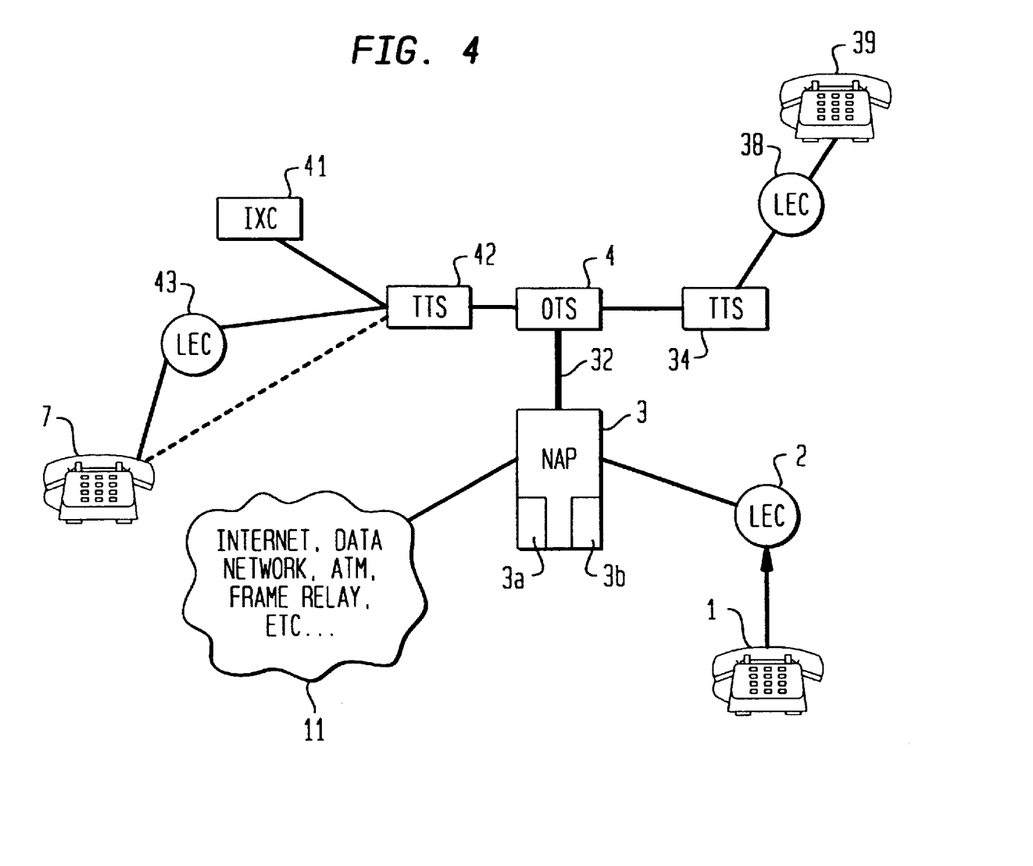
FIG. 4 is yet another embodiment of the present invention illustrating an AT&T Digital Link (ADL) call being processed via a NAP.

As discussed, embodiments of the present invention may permit customers/subscribers to utilize a variety of proprietary services, including SDN, Megacom, ADL, or any such proprietary service, without purchasing dedicated CPE or separate direct access trunks for each of such desired services. Accordingly, a subscriber may be able to take advantage of a variety of available services without expending additional resources for each service separately. It will be recognized by one of ordinary skill in the art that both SDN calls and Megacom calls provide long distance access; such calls will generally require spate trunk lines or a separate SSA PRI connecting the NAP to the telecommunications system. Calls offering local access, for example, ADL calls or other such suitable calls, may utilize the same trunk or SSA PRI for call processing via a NAP as a Megacom call or, in the alternative, an SDN call. FIGS. 3 and 4 illustrate additional exemplary embodiments of at least two such uniquely tariffed services that may be processed via a NAP, in accordance with present invention.

FIG. 3 illustrates, in accordance with exemplary embodiments of the present invention, Megacom access via a NAP while FIG. 4 illustrates ADL access via a NAP. The implementation procedure of a Megacom call and/or an ADL call and or other such suitable call may by a NAP may generally be similar with specific differences as to the type of data that may be processed and/or the routing of such outbound calls. The present invention supports the ability for the Public Switched Telephony Network (PSTN) to support tariffed based services from a network node, for example, a NAP 3 using existing Integrated Switched Digital Network Primary Rate Interface 32 (ISDN PRI) signaling capabilities. As discussed above, a NAP may be comprised of an Intelligent Peripheral/Service Node IP/SN) and/or any other such suitable intelligent switch. The existing interface may be proprietary and thus could support the necessary security and fraud prevention measures as may be required by the system. A calling party 1, who may be a subscriber of, for example, SDN, Megacom, ADL, and/or any other such suitable service may send a trigger to process the desired call to the NAP 3. The triggering function, for example, may include DID features wherein the Megacom and/or ADL subscriber dials a special telephone number which originates a call. The special number or trigger may be unique, for example, to the service subscriber as well as the specific outbound service. Thus, for example, the trigger for the Megacom call may be different and unique than the trigger for the ADL service. The unique trigger may not only identify the particular type of service, but may also indicate who the subscriber is. The trigger may be sent by the calling party/subscriber 1 via the telephone or in the alternative via the Internet. The calling party 1 may, for example, trigger the NAP 3 by dialing an appropriate code through inband signaling prior to dialing the desired destination number. The originating call containing the trigger may be routed through to local exchange carrier (LEC) 2 as shown or directly to the NAP 3 (not shown). Where the NAP 3 receives a trigger from the calling party/subscriber 1, the NAP 3 may determine whether the subscriber desires to make a long distance or an international call via Megacom or in the alternative whether the subscriber desires to make a local/toll call via ADL. The NAP 3 may include a processor which recognizes this special dialed number or trigger as, for example, an ADL call, or a Megacom call or any other such suitable call or service. The NAP 3 locates the subscriber's information associated with the dialed number, for example, a return telephone number stored in a memory 3a and returns the subscriber's call whether it is a Megacom call or an ADL call or other such outbound service call. By using DID, the NAP 3 receives the originating call from, for example, the SDN subscriber but the NAP 3 may not answer the call. The Megacom and/or ADL subscriber, for example, may allow the phone to ring for an allotted two or three rings and the subscriber may hang up. The NAP 3 retrieves information associated with the dialed number and may return the subscriber's call based on the desired service and/or the retrieved information. The call returned by the NAP 3 may routed through LEC 2 or a direct connection between the calling party/subscriber 1 to the NAP 3 (not shown). The calling party/subscriber 1 may change the call back number stored within, for example, the NAP memory 3a at any time before triggering the outbound service call. As stated earlier, the caling party/subscriber 1 may initiate or trigger the NAP to set up the desired call via the Internet of from an ATM network, frame relay network or other such suitable network 11. Thus, for example, the calling party/subscriber 1 may trigger the NAP 3 while on-line. The calling party/subscriber 1 may send out the appropriate trigger representing the type of call they desire to complete. If the Internet is used to trigger the NAP 3, the calling party/subscriber 1 may wish to store the appropriate call back number in the memory of the NAP 3a. This may be accomplished by the calling party/subscriber 1 prior to initiating the call via, for example, the Internet. The NAP may be connected to triggered by, for example, the Internet, or an ATM network or a frame relay network 11 or any other such suitable network as shown in FIG. 3. The call back number may be stored within the NAP 3 or at an external location where it may be easily accessed by the NAP 3. In addition, the call back number may be unique for each different type of outbound call. For example, the caling party/subscriber 1 may wish the NAP to call back a first number if a SDN call is desired or a second number if an ADL call is desired or even a third number if a Megacom call is desired. As discussed earlier, OTS 4 may include a memory sufficient to maintain an ANI which may be used for billing and/or identification purposes. Moreover, OTS 4 may further include a controller used to efficiently route calls.

Once the NAP determines that the calling party/subscriber 1 desires to make an outbound service call, the NAP subsequently returns the call at the designated can back number. After the NAP 3 returns the Megacom and/or ADL subscriber's originating call, the NAP 3 may prompt the subscriber for information regarding the call the subscriber wishes to place. The prompted information may include information related to, for example, the destination number for the particular outbound service call the caller wishes to place. The NAP may prompt the calling party/subscriber 1 to supply information by, for example, a voice activated response, by DTMF inputs, via a personal computer or other suitable method known in the art. NAP 3 may further solicit information such as, for example, a password to verify that the caller is a legitimate subscriber of Megacom and/or ADL outbound service or other such suitable outbound service. Thus, for example, if the calling party/subscriber 1 initiates a Megacom call, the NAP 3 may solicit a previously selected Megacom password or other such information related to the completion of the desired outbound service call. The NAP 3 may further prompt the calling party/subscriber 1 to supply a desired called number which may have been previously stored in a memory 3b of the NAP 3.

Where the NAP 3 receives the appropriate information form the calling party/subscriber 1 the NAP 3 may set up the appropriate outbound call via, for example, OTS 4. An OTS 4, for example, may comprise 190 4 electronic switching system manufactured by Lucent Technologies, Inc. or other large or small toll switches known in the art. As shown in FIGS. 3 and 4, the NAP 3 may be connected to the OTS 4 via a ISDN PRI 32. As stated above, the NAP may communicate with OTS 4 via a variety of suitable protocols, for example, the Q.931 protocol. As discussed in more detail below, the Q.931 protocol may be utilized by the NAP 3 to forward all pertinent information to the OTS 4 for processing the specific outbound service call based on subscriber information. The OTS 4 determines, via existing ISDN PRI signaling capabilities, that the NAP 3 is required to process the outbound service call. The NAP 3 may further send a proprietary billing number to OTS 4 for network recording purposes. The NAP 3 may send service coding data, for example, Megacom service coding data to the OTS 4 for specific tariff service functionality. In the alternative, the NAP 3 may transfer SDN and/or ADL service coding data to OTS 4. This functionality may be unique to each of the outbound or tariff services and may include different screening, routing and/or billing options. Since Megacom supports long distance and international calls, information pertinent to processing such calls may be transmitted from said NAP 3 to OTS 4. The network OTS 4, based on the appropriate network call processing, routes the call to a terminating service switching point (SSP) (not shown) having an appropriate terminating toll switch 35 (TTS). The TTS 35 may route the call to the appropriate destination depending on the original called party number dialed by the calling party/subscriber 1. The routing by TTS 35 may further depend on the type of outbound call placed by the subscriber. As shown in FIG. 3, if the subscriber places a Megacom call, the TTS 35, which may be part of an inter-exchange carrier's network, may route the call to LEC 36 if a long distance number was dialed. In the alternative, the call may be routed to an International Switching Center 33 (ISC) if an international telephone number was dialed by the calling party/subscriber 1. The ITS 35 may further connect directly to a called party CPE (not shown), if the called party is also an, for example, Megacom subscriber. Accordingly, a Megacom call may be completed by a NAP, in accordance with an exemplary embodiment of the present invention.

In the alternative, as shown in FIG. 4, if the calling party/subscriber 1 places an ADL type of call, the TTS 42 may route the call to the LEC 43 if a local number was dialed or to the Inter-exchange carrier 41 (IXC) if a toll telephone number was originally dialed by the calling party/subscriber 1. The TTS 42 may route the call to the appropriate destination depending on the original called party number dialed by the calling party/subscriber 1. In addition, the TTS 42 may further connect directly to the CPE (not shown) of the called party 7, if the called party is also an, for example, ADL subscriber. Accordingly, an ADL call may be completed by a NAP, in accordance with an exemplary embodiment of the present invention.

In embodiments of the present invention, calls other than outbound service calls via the NAP 3 may be made without utilizing additional lines and/or equipment. Referring again to FIGS. 3 and 4, if the calling party/subscriber 1 desires to place a regular POTS call, without utilizing an outbound service, the calling party/subscriber 1 may dial the called party's 39 number as usual. The NAP 3, upon receiving the call will realize that a regular call is required to be completed and thus may forward the call to OTS 4 without initiating the outbound service call procedures described above. The OTS 4 may subsequently forward the call to the appropriate TTS 34 which may determine that the called party 39 is within the area of LEC 38. Accordingly, a non-outbound call or regular POTS call may be completed within the same system as the outbound service calls.

Accordingly, under embodiments of the present invention, described above, local calls may be made bypassing the LEC and thus permitting the IXCs to effectively compete in the local telecommunications market.

In the exemplary embodiments of the present invention described above, the NAP 3 may further send a set-up message, for example, a Q.931 protocol to a microprocessor located in OTS 4 for processing the desired outbound call. The NAP 3 may be connected to OTS 4 or any such switch located in a communications network via, for example, an integrated services digital network primary rate interface 32 (ISDN PRI) or any such suitable interface. The Q.931 protocol information forwarded to the microprocessor located in the OTS 4 is capable of distinguishing SDN calls from, Megacom calls, ADL calls, other non-outbound service calls.

Q.931 protocol, may comprise, for example, data representing the routing number of the desired called party, the numbering plan identity, the type of number identifier, the network specific facility (NSF), the transfer capability identifier of the bearer capability and/or the billing customer number. Additional data may be included for enhanced features or more efficient completion of the desired outbound call. The routing number may be the desired called number stored in memory 3b of the NAP. Data representing the routing number can be a 7-digit number or a 10-digit number which identifies a desired called party. The called party number may be a local number or a long distance number or even an international number based on the number dialed by the calling party/subscriber 1 and/or the specific type of outbound service. The outbound service may be, for example, SDN service, Megacom service, ADL service or any other such suitable service.

The numbering plan identity data represents either an integrated service digital network (ISDN) or a private numbering plan such as a software defined network or any other suitable numbering plan for directing the appropriate type of outbound service call. The type of number identifier data represents the type of call being made. For example, in SDN type calls, the number identifier data may represent subscriber numbers that are numbers generally associated with a private network plan such as a software defined network plan. SDN calls may also include national or long distance calls and/or international calls. Alternatively, for Megacom calls, the number identifier data may represent an international call or a long distance national call, also known as a national call. In the case of ADL calls, number identifier data may include data which represents a local/toll call.

The NSF data at least includes data associated with identifying a call as either a software defined network call or a call that does not incorporate the features of a private network plan.

The transfer capability identifier of the bearer capability represents data associated with the type of signal being transmitted and received. For example, in most cases, voice signals are being transmitted and received. However, image signals or data signals sent via an Internet may be transmitted and received in the present system.

The customer billing number is a 10-digit number which identifies the customer for billing purposes. This number must be included to correctly bill the customer for the call placed.

In order for OTS 4 to process the desired outbound service call over the NAP 3, the Q.931 protocol must include certain data for OTS 4 to recognize the call as, for example, an SDN call, Megacom call, an ADL call and/or any other such suitable call. For example, if the data associated with the numbering plan identity is "private" or "ISDN" and the type of number identifier is "national", "international" or "subscriber", and the NSF is "SDN", having the bearer capability as "voice",or "Internet" and the customer billing number supplied, OTS 4 will recognize the call as a SDN call and forward the call for further processing. On the other hand, if the data associated with the numbering plan identity is "private" or "ISDN" and the type of number identifier is "national", or "international" and the NSF is "Megacom", having the bearer capability as "voice", or "Internet" and the customer billing number supplied, OTS 4 will recognize the call as a Megacom call and forward the call for further processing. Similarly, if the type of the type of number identifier is "local", or "toll" and the NSF is "ADL", having the bearer capability as "voice", or "Internet" and the customer billing number supplied, OTS 4 will recognize the call as a ADL call and forward the call for further processing. It should be noted that the above information supplied to the OTS 4 via the Q.931 protocol is only given by way of an example. Other types or combinations of information and or protocols may be provided to the OTS for proper call processing based on the type of outbound call, destination, and/or other parameters within the scope of the present invention. In addition, since both SDN calls and Megacom calls, provide long distance access, such service calls will generally require separate trunk lines or a separate SSA PRI connecting the NAP to the telecommunications system. Calls offering local access, for example, ADL calls or other such suitable calls, may utilize the same trunk or SSA PRI for call processing via a NAP as a Megacom call or, in the alternative, an SDN call.

Figure 5:
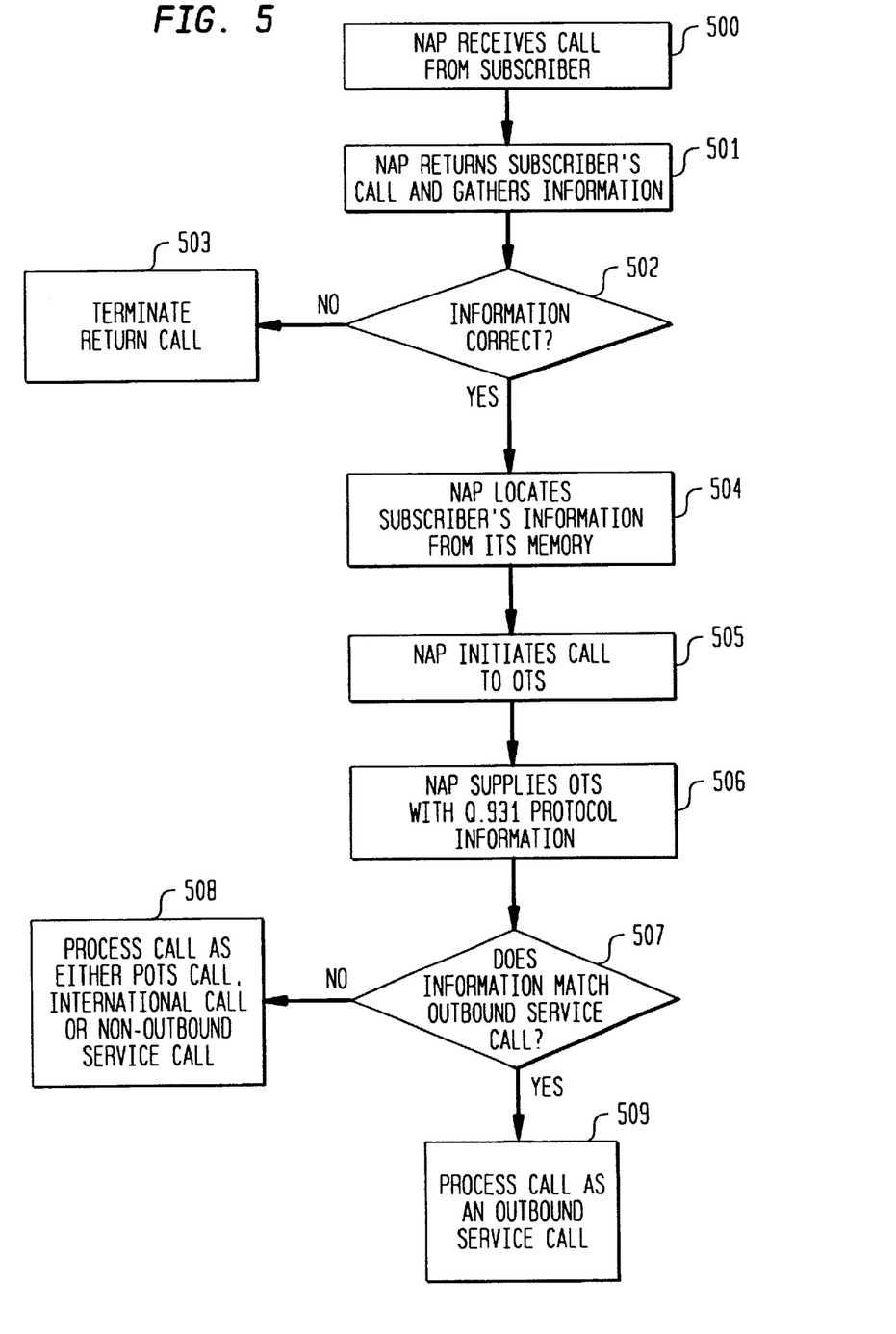
FIG. 5 is a logical flow diagram for routing a plurality of outbound service calls in accordance with the present invention.

FIG. 5 is a flow diagram of exemplary embodiments of the present invention. In step 500, a subscriber of an outbound service may place an appropriate originating call to NAP 3. If the caller is a subscriber, the caller may send a trigger representing either an SDN call, Megacom call, ADL call or any other such suitable outbound service call. Using, for example, DID, the NAP 3 returns the subscriber's originating call and prompts the subscriber for information as shown in step 501. If the information such as a password or a stored desired called number is not correct in step 502, the return call is terminated as shown in step 503. However, if the correct information is supplied in step 502, the call proceeds to step 504 where the NAP 3 locates stored information of the outbound service subscriber. Once the NAP 3 locates the stored SDN subscriber's information containing the desired called number and verifies the password, the NAP 3 initiates a call to an OTS 4 as shown in step 505. In step 506, the NAP forwards, for example, Q.931 protocol data with the initiated call to OTS 4. If the Q.931 protocol data does not match data for the appropriate outbound service call, as shown in step 507, the call is processed as a regular plain old telephone service (POTS) or non-outbound service call, a prior-art NAP call or as an international call as shown in step 508. If the data supplied to OTS 4 identifies the call as an appropriate outbound service call, for example, an SDN, Megacom, ADL, or other such suitable calls in step 507, the call is processed appropriately as shown in step 509. Processing of such outbound service calls is performed on a call by call basis using the same SSA PRI type as other calls. This alleviates the need for specialized equipment and dedicated special trunk groups to handle outbound service calls for each particular outbound service subscriber. Thus a an individual or entity will have the tremendous flexibility of utilizing a plurality of available services in the future without being limited by the end equipment or trunk lines.

Although several preferred embodiments of this invention have been described in detailed therein with reference to the accompanying drawings, it is to be understood that the invention is not limited to these illustrative embodiments, and that the various changes and modifications may be affected therein by one skilled in the art without departing from the true spirit and full scope of the invention as defined in the appended claims. Any U.S. Applications referred to herein should be deemed to be incorporated by reference as to their entire contents in the event one of ordinary skill in the art deems the same to be essential to their understanding of the present invention.

I claim:

1. In a telecommunications system having a plurality of switches, a method of initiating a variety of available outbound service calls by a network adjunct platform (NAP), comprising the steps of:

receiving a trigger, unique to a desired outbound service call, at a NAP to contact a subscriber;

providing data identifying said subscriber to said NAP in response to said unique trigger;

contacting said subscriber by said NAP;

receiving information from said subscriber;

retrieving stored data associated with said information received from said subscriber;

initiating a call by said NAP to a switch based on said retrieved data;

forwarding, by said NAP, set-up data with said initiated call;

determining responsive to said set-up data whether said initiated call requires said desired outbound service switch processing; and processing said initiated call as the desired outbound service call when said call requires desired outbound service switch processing.

2. The method according to claim 1, a first of said variety of available outbound service calls being a software defined network (SDN) call.

3. The method according to claim 1, a second of said variety of available outbound service calls being an AT&T digital link (ADL).

4. The method according to claim 1, a third of said variety of available outbound service calls being a Megacom call.

5. The method according to claim 1, said step of receiving a trigger unique to a desired outbound service call comprises receiving a direct inward dialing call.

6. The method according to claim 1, said step of receiving a trigger unique to a desired outbound service call comprises receiving said trigger via an Internet.

7. The method according to claim 1, wherein said step of receiving information comprises receiving a password from said subscriber.

8. The method according to claim 7, said password is unique for each of said desired outbound service call.

9. The method according to claim 1, wherein said step of receiving information comprises receiving a telephone number of a called party.

10. The method according to claim 9, wherein said telephone number of said called party is stored in a memory of said NAP.

11. The method according to claim 1, wherein said step of providing data comprises providing an automatic number identification (ANI).

12. The method according to claim 1, wherein said step of providing data comprises providing a return call telephone number.

13. The method according to claim 12, said return call telephone number is selected by said subscriber based on the desired outbound service call.

14. The method according to claim 1 further comprising the step of evaluating said set up-data by said switch.

15. The method according to claim 14, said set-up data being unique to the desired outbound service call.

16. The method according to claim 1, said NAP comprising an intelligent peripheral/service node (IP/SN).

17. The method according to claim 16, said IP/SN is connected to a telecommunications network via a proprietary interface.

18. The method according to claim 17, said proprietary interface being an integrated switched digital network primary rate interface (ISDN PRI).

19. The method of claim 1, wherein said step of determining whether said initiated call requires desired outbound service switch processing comprises:
- identifying a numbering plan as private;
- identifying a type of number as subscriber;
- identifying a network specific facility as the desired outbound service;
- identifying an information capability identifier as voices; and
- identifying a ten digit billing number.

20. In a telecommunications system having a plurality of switches, a method of initiating an outbound service call by a network adjunct platform (NAP), comprising the steps of:
- receiving a unique trigger at a NAP from a subscriber;
- determining based on said unique trigger whether said NAP is required for call processing;
- where said NAP is required, determining by said NAP the type of outbound service required to process said outbound service call based on said unique trigger;
- receiving call processing data and customer destination number for said outbound service call;
- connecting said NAP to a communications network via a proprietary interface; and
- setting up by said NAP said outbound service call through said communications network on a call by call basis.

21. A telecommunications system for initiating a variety of available outbound service calls by a network adjunct platform (NAP), comprising:
- receiving means for receiving a trigger, unique to a desired outbound service call, at a NAP to contact a subscriber;
- output means for providing data identifying said subscriber to said NAP in response to said unique trigger;
- communicating means for contacting said subscriber by said NAP;
- receiving means for receiving information from said subscriber;
- retrieving means for retrieving stored data associated with said information received from said subscriber;
- initiating means for initiating a call by said NAP to a switch based on said retrieved data;
- output means for forwarding by said NAP, set-up data with said initiated call;
- processing means for determining responsive to said set-up data whether said initiated call requires said outbound service switch processing; and
- processing means for further processing said initiated call as the desired outbound service call when said call requires outbound service switch processing.

22. The system of claim 21, said variety of available outbound service calls being one of a software defined network (SDN) call, an AT&T digital link (ADL) call or a Megacom call.

23. The system of claim 21, said means for receiving said unique trigger comprises a means for receiving a direct inward dialing call.

24. The system of claim 21, said means for receiving said unique trigger comprises means for receiving said unique trigger via an Internet.

25. The system of claim 21, said received information being a password.

26. The system of claim 21, said password is unique for each of said desired outbound service call.

27. The system of claim 21, said received information is a telephone number of a called party.

28. The system of claim 27, said NAP comprising a memory for storing said telephone number of said called party.

29. The system of claim 21, said data identifying said subscriber is an automatic number identification (ANI).

30. The system of claim 21, said data identifying said subscriber comprises a return call telephone number.

31. The system of claim 30, said return call telephone number is selected by said subscriber based on the desired outbound service call.

32. The system of claim 21, said NAP comprising an intelligent peripheral/service node (IP/SN).

33. The system of claim 32, said IP/SN is connected to a telecommunications network via a proprietary interface.

34. The system of claim 33, said proprietary interface being an integrated switched digital network primary rate interface (ISDN PRI).

35. The system of claim 34, wherein said set-up data comprises:
- a routing number;
- a numbering plan identity;
- a type of number identifier;
- a network specific facility; and
- an information transfer capability identifier.

36. The system of claim 35, wherein said routing number identifies said called party.

37. A telecommunications system for initiating an outbound service call by a network adjunct platform (NAP), comprising:
- receiving means for receiving a unique trigger at a NAP from a subscriber;
- processing means for determining based on said unique trigger whether said NAP is required for call processing;
- where said NAP is required, processing means for further determining by said NAP the type of outbound service required to process said outbound service call based on said unique trigger;
- receiving means for receiving call processing data and customer destination number for said outbound service call;
- coupling means for connecting said NAP to a communications network via a proprietary interface; and
- configuring means for setting-up by said NAP said outbound service call through said communications network on a call by call basis.

* * * * *